Figure 8:
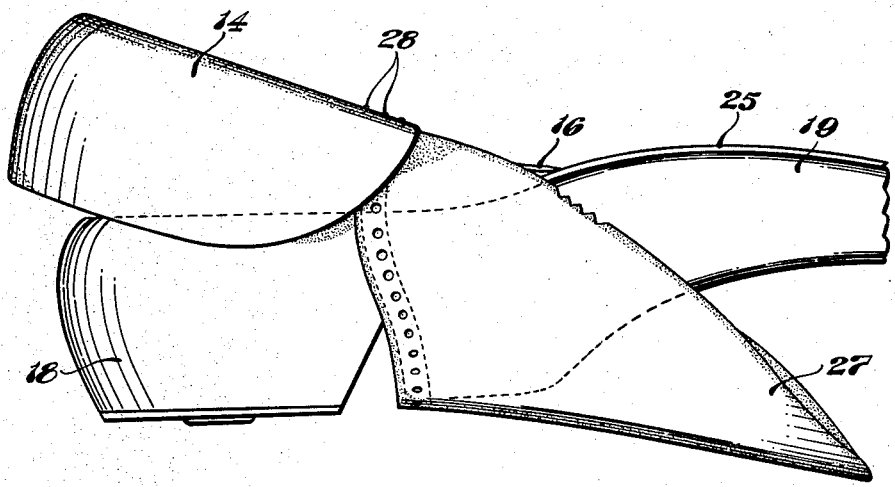

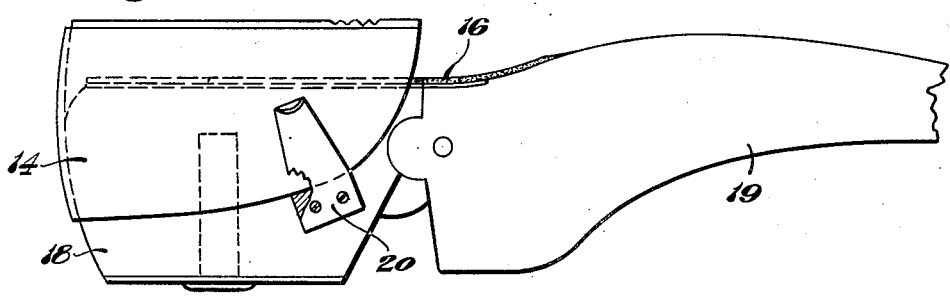
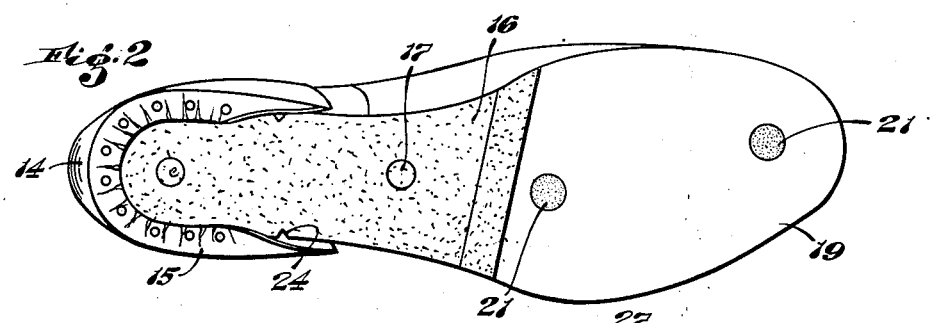
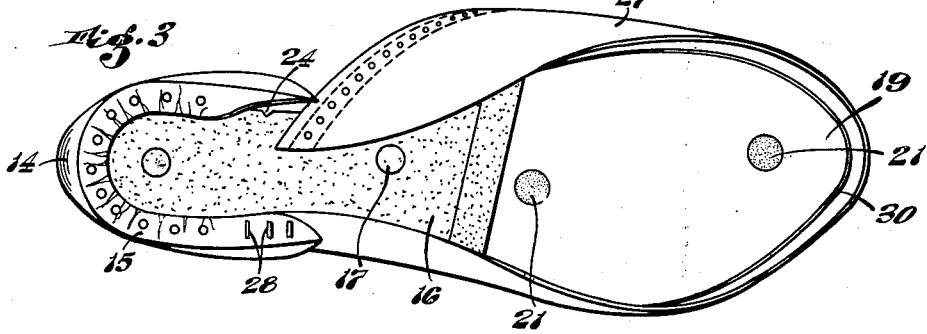
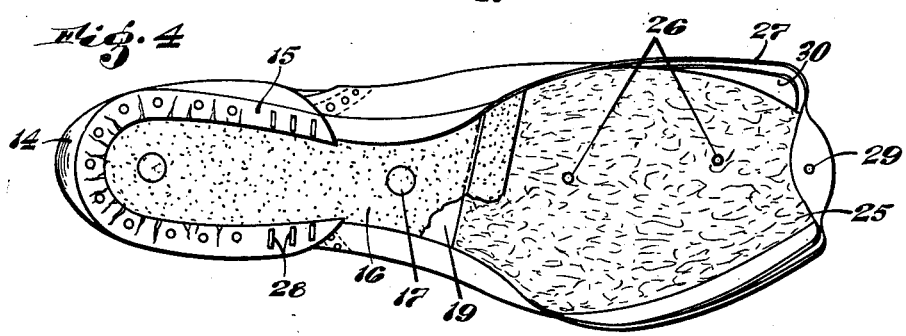

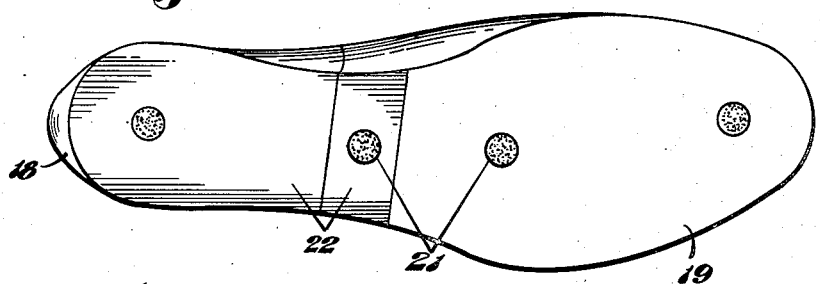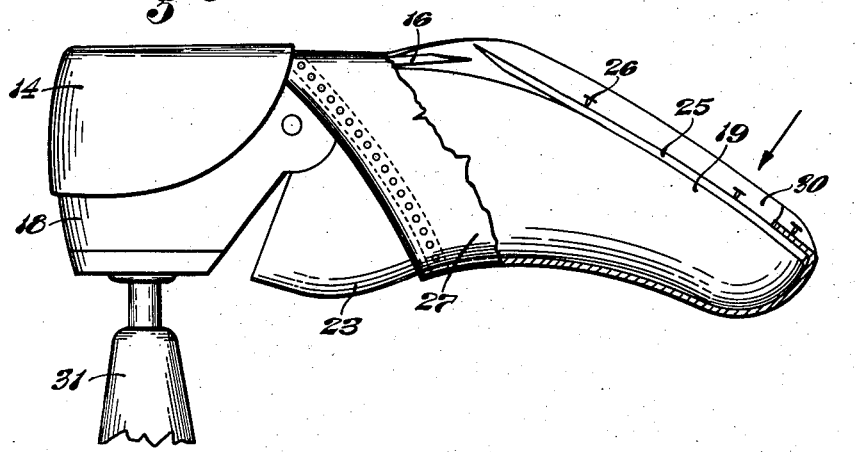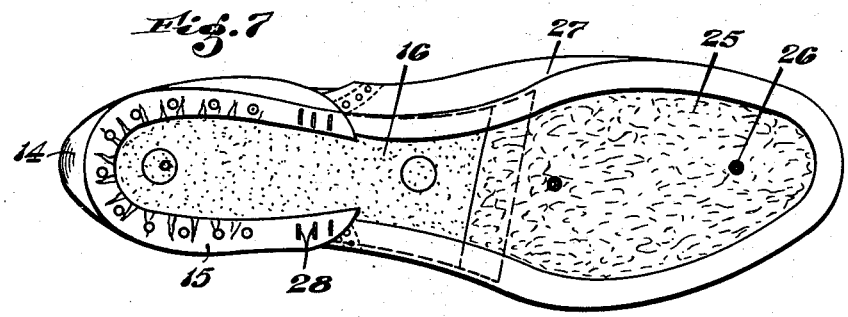

Patented Sept. 12, 1950

2,521,981

UNITED STATES PATENT OFFICE 2,521,981

PROCESS OF MAKING SHOES WITH MOLDED COUNTER PORTIONS

Verne L. Kneeland, Manchester, N. H.

Application January 12, 1949, Serial No. 70,512

9 Claims. (Cl. 12—145)

This invention comprises a new and improved process of making shoes which includes a molded counter portion as an essential element such, for example, as men's opera slippers, loafers, casuals and the like.

The cost of such shoes is substantially reduced and the shoemaking quality improved by molding the counter portion with its lining as a unit in complete finished condition and assembling it with the other parts of the upper and the shoe bottom. Particularly fine shoemaking lines may be brought out in molding the counter portion, a high grade finish imparted to its upper edge, and an accurate flange with a perfect heel seat line molded into its lower edge. An object of the present invention is to utilize such molded counter portions with particular advantage in the manufacture of shoes.

Going more into detail, I have found that the shoemaking operations are substantially simplified and improved in accuracy and uniformity by heel seat lasting and nailing a molded counter portion of a shoe to the rear end of an insole and fastening the rear corners of a vamp and the forward corners of a counter portion to the insole in overlapping relation on both sides of the shoe and in the narrowest part of the shank. Having fastened the vamp in this manner, I have found that forward draft upon the upper causes it naturally to conform with the contour of the last throughout the shank and practically to the tip line so that the operation of side lasting is substantially obviated and the shoemaker has only to secure the margins of the vamp along the sides of the shoe in the position to which they have been already drawn by the forward draft.

As herein shown, the process of my invention is characterized by nailing the flange of a molded counter portion to the rear end of the insole about the heel seat leaving the forward corners of the counter portion unsecured, then bringing the rear corners of a vamp into overlapping relation and securing these elements in position by a metallic fastener driven through the superposed corners of the counter portion and the vamp as well as the underlying insole. Preferably and as herein shown, the rear corners of the vamp are brought beneath the unsecured front corners of the counter portion where they may be accurately located with respect to gauge marks on the insole.

The process of my invention is further characterized by the employment of a two-part insole, that is to say, a heel and shank portion and a forepart portion, and by bringing such portions of an insole into cooperative relation to provide a full length insole. One manner of effecting this result is shown herein and consists in temporarily securing the heel seat and shank portion of an insole to the heel portion of a hinged last with its forward edge extending forwardly beyond the division line of the last, securing the forepart of the insole to the forepart of the last while inserted in broken condition in the upper, and then straightening the last and thereby causing the rear edge of the forepart of the insole to snap past the forward edge of the shank portion of the insole and become interposed between it and the last bottom.

My invention is further characterized by the step of inserting a low-cone last through the bottom of the upper while the heel seat and shank portion of the insole rests upon the bottom of the last during its inserting movement. This step is rendered possible and convenient because up to that stage of manufacture the bottom of the upper or vamp is left open and unattached, the insole not being completed until the forepart portion thereof is introduced in position on the last.

These and other features of the invention will be best understood and appreciated from the following description of a preferred manner of putting into effect the process of my invention as illustrated in the accompanying drawings, in which:

Fig. 1 is a view in elevation showing a last with a counter portion and the rear portion of an insole positioned thereon, Figs. 2, 3 and 4 are plan views showing successive steps of the process, Fig. 5 is a plan view of the last bottom, Fig. 6 is a view in elevation, partly in section, showing a spindled last ready to be straightened after insertion into the partially finished shoe, Fig. 7 is a plan view of the shoe bottom on the straightened last, and Fig. 8 is a view in elevation showing the step of inserting a last through the bottom of the shoe.

In carrying out the present invention a lined counter portion 14 is first prepared, either by molding in forming dies or by molding and heel-seat nailing upon the heel end of a last. The latter procedure is indicated in Fig. 1 where the counter portion 14, which includes a lining and an interleaved stiffener, is shown as located in gauged position upon the heel end 18 of a hinged last 18—19. The last is provided with spring clips 20 which are secured to the opposite sides of its cone in position to hold the counter portion conformed to the contour of the last and with its margin projecting above the last bottom by precisely the amount of material to be folded inwardly in forming the flange 15 shown in Fig. 2.

The last itself, as shown in Figs. 1 and 5, is provided with lead plugs 21 in its bottom to receive insole tacks, and its heel-seat and shank faces are protected with sheet steel 22. The last is of novel contour in that it has a low forepart so that it may be inserted in the upper as will be presently described. The usual instep peak of the forepart of the last is removed and the last is flattened and rounded in that region so that it does not extend above the plane of the top of the cone. The last as a whole will therefore pass freely into any opening that is large enough to receive its heel end.

When the counter portion is molded and heel-seat nailed in one operation, it is usually moistened or tempered and then molded to the last by the action of a heel-seat nailing machine in which the last is spindled, the counter portion firmly embraced by an encircling band, and its upstanding marginal portion wiped inwardly over the heel-seat of the last and the rear end of an insole which has been previously tacked to the last bottom. The wipers of the heel-seat laster make several inward strokes forming the flange 15 and sharply defining the heel-seat line. Then while the wipers maintain pressure on the flange 15, the heel-seat nails are driven through the flange and insole and clenched upon the steel bottom face of the heel end 18 of the last.

In carrying out the process of the present invention a short or half insole 16 is employed. This comprises the heel-seat end and shank portion of a conventional insole and terminates in a transverse beveled edge located substantially in the ball line of the shoe. As herein shown, this insole member is provided with circles 17 which indicate the location of the underlying lead plugs 21 in the last so as to enable the insole tacks to be driven into the plugs. A pair of gauge notches 24 is also provided in the shank portion of this insole member to indicate the proper location of the rear ends of the vamp when that is assembled as it is with the counter portion 14 and the short insole member 16.

Fig. 2 represents the molded counter portion 14 on the last at the conclusion of the heel-seat nailing operation, and it will be noted that the front corners of the counter portion are unsecured at this stage of the process and the gauge notches 24 in the insole 16 are therefore not obscured.

The next step of the process consists in assembling the vamp and securing its rear corners in place as well as securing the hitherto unattached corners of the counter portion. This may be effected either on the last or off the last. As suggested in Fig. 3, the rear corners of the vamp 27, having a lining 30, are brought accurately to register with the gauge notches 24 upon the surface of the insole member 16. The loose forward corners of the counter portion are then forced inwardly into conformity with the edge of the insole member 16 and in overlapping relation with the rear corners of the vamp. When thus located the parts are permanently secured in position by staples 28, three of these being shown in Fig. 3 as being driven through the flange 15 of the counter portion, the rear corner of the vamp and the insole member 16. The staples 28 are either clenched against the steel facing 22 of the last bottom, or if this operation is performed off the last, the staples are clenched in the anvil of the stapling machine. In any case, however, the vamp is permanently secured to the insole member at substantially the narrowest point in the shank. As a general thing it will be more convenient to remove the attached counter portion and insole from the last and carry out the stapling operation in a stapling machine, and in that case the anvil of the stapling machine will support the insole member 16 during the stapling operation.

When this procedure is carried out, the forepart 25 of the insole is first tacked to the forepart of the last bottom by tacks 26, as shown in Figs. 4 and 6. The insole forepart 25 terminates in a transverse beveled rear edge complementary to the forward edge of the rear half insole. When the last is broken, the rear edge of the insole forepart projects outwardly from the last bottom in the vicinity of the forward edge of the insole shank portion 16. The last may be inserted through the unsecured bottom of the vamp as suggested in Fig. 8 with the insole shank portion resting upon the last bottom and guiding the last itself into place. The insertion of the last in this manner is novel and is made possible by leaving unsecured the whole forepart of the vamp and by modifying the contour of the last so that it will pass freely through the opening thus afforded. The last may be inserted in partially broken condition and then when the last is straightened the rear edge of the insole forepart is caused to snap past the forward edge of the insole shank part so that the two edges are brought into overlapping relation at the ball line of the shoe and may be cemented together to form a complete insole.

Having completed the insole in this manner, the upper is pulled over and its tip fastened by a pulling-over tack 29 as shown in Fig. 4. In this operation the forward draft imparted to the vamp causes the shank and forepart of the vamp to conform closely to the shank and forepart of the last. The necessity for a separate side lasting operation is obviated and the operator has only to work the margin of the vamp into overlying relation to the insole in which position it is secured by cement. The pulling-over tack is then drawn and the toe lasted, completing the bottom of the shoe as shown in Fig. 7 in readiness for the attachment of the outsole.

It will be noted that by employing a two-part insole I am able to insert a low-peak last through the open shoe bottom after incorporating one part of the insole in the shoe. Then, after the last has been inserted, the insole is completed by having its other part brought into position.

Having thus disclosed my invention and described in detail one manner in which it may be carried out, I claim as new and desire to secure by Letters Patent:

1. A shoemaking process characterized by the steps of heel seat lasting and nailing a molded counter portion of a shoe to the rear end of an insole, fastening the rear corners of a vamp and the forward corners of the counter portion to the insole in overlapping relation on both sides of the shoe and in the narrowest part of the shank, then inserting a low-cone last through the bottom of the partially fastened vamp, seating the insole on the last bottom, and then causing the vamp to conform to the last by fastening it at the toe under lengthwise tension.

2. A shoemaking process including the steps of placing the heel seat and shank portion of an insole together with an attached molded counter portion on the rear end of a hinged last, fastening the forepart of an insole to the forepart of the last, and then straightening the last and thereby causing the rear end of the forepart to snap past the forward end of the shank portion into underlying relation therewith.

3. A shoemaking process including the steps of placing a molded counter and the attached heel seat and shank portion of an insole on the rear end of a hinged last with the forward end of the insole portion extending forwardly beyond the division line in the last bottom when the last is in broken condition, attaching the forepart of an insole to the forepart of the last with its rear edge also located in advance of the division line in the last bottom, and then straightening the last and thereby causing the rear edge of the insole forepart to snap under the forward edge of the shank portion.

4. A shoemaking process including the steps of placing a molded counter portion together with the heel seat and shank portion of an insole on the rear end of a hinged last, attaching the rear corners of a vamp to the forward ends of the counter portion, inserting a low-cone last through the bottom of the shoe with the forepart of an insole tacked thereon, and uniting the two insole portions.

5. A shoemaking process including the step of placing on the rear end of a last the molded counter portion of a shoe wtih the heel seat and shank portions of an insole attached thereto throughout the flange of the counter portion except at the front ends of the counter portion, locating the rear corners of a vamp in gauged relation between the shank portion of the insole and the front corners of the counter portion, then stapling the three superposed plies thus arranged, and then inserting a low-cone last through the bottom of the vamp with the forepart of an insole attached to the last bottom.

6. A shoemaking process which comprises the steps of attaching the forward corners of a molded counter portion and the rear corners of a vamp to a half insole, then inserting through the unattached portion of the vamp a last having a forepart insole tacked upon its bottom, uniting half insole and forepart insole, and lasting the vamp to the complete insole thus provided.

7. A shoemaking process which comprises the steps of heel-seat nailing a molded counter portion to the heel-seat of a short insole member located on the last bottom, overlapping the front corners of the counter portion and the rear corners of a vamp and stapling them to the shank of said short insole member, then inserting a last, heel first, into the upper through the unattached forepart of the vamp, and completing the insole by attaching a forepart portion to the short insole member which is already in place upon the last bottom.

8. A shoemaking process characterized by the steps of providing an upper having a molded counter portion and securing said upper to an insole member by heel-seat tacks, inserting a last in the upper and bringing the molded counter portion into fitting relation with the rear end of the last, and then drafting forwardly the upper and securing it by pulling over tacks at the toe while the rear end of the upper is anchored in position on the rear end of the last by its molded fitting thereon.

9. The process described in claim 8 further characterized by the step of fastening both sides of the upper in place at the narrowest part of the shank and thus drawing the margins of the upper over the last bottom along the sides of the shoe.

VERNE L. KNEELAND.

No references cited.